(12) United States Patent
Mao et al.

(10) Patent No.: US 9,570,994 B1
(45) Date of Patent: Feb. 14, 2017

(54) ADJUSTABLE BLANKING TIME FOR OVERLOAD PROTECTION FOR SWITCH-MODE POWER SUPPLIES

(71) Applicant: Infineon Technologies Austria AG, Villach (AT)

(72) Inventors: Mingping Mao, Singapore (SG); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/823,860

(22) Filed: Aug. 11, 2015

(51) Int. Cl.
 *H02M 3/335* (2006.01)
(52) U.S. Cl.
 CPC .............................. *H02M 3/33546* (2013.01)
(58) Field of Classification Search
 CPC .............. H02M 3/3376; Y02B 70/1433; Y02B 70/126; G05F 1/33
 USPC ................... 363/17, 21.02, 21.03, 21.12–21.18,363/89–90
 See application file for complete search history.

(56) References Cited

U.S. PATENT DOCUMENTS

| | | | | |
|---|---|---|---|---|
| 8,009,445 B2 * | 8/2011 | Nakamura | ............... | H02M 1/32 363/21.12 |
| 8,194,424 B2 * | 6/2012 | Stanley | ................... | H02M 7/48 323/235 |
| 8,537,574 B2 * | 9/2013 | Isogai | ..................... | H02M 1/32 363/21.12 |

OTHER PUBLICATIONS

"ICE1HS01G, Half-Bridge Resonant Controller," Infineon, Power Management & Supply, Datasheet, Version 2.0, Aug. 24, 2009, 18 pp.
"L6699, Enhanced high voltage resonant controller," STMicroelectronics, Datasheet, Doc ID 022835 Revision 1, Apr. 2012, 38 pp.
"TEA1716T, Resonant power supply control IC with PFC," NXP Semiconductors, Datasheet, Revision 3, Nov. 30, 2012, 47 pp.

* cited by examiner

*Primary Examiner* — Nguyen Tran
(74) *Attorney, Agent, or Firm* — Shumaker & Sieffert, P.A.

(57) ABSTRACT

A blanking time for a switch-mode power supply controller includes a first blanking time interval and a second blanking time interval. During the first blanking time interval, the time to charge the feedback voltage at the feedback input of the switch-mode power supply is measured, and a timer setting time is stored based on the measured time. During the second time interval, a series of charge cycles is used. At each charge cycle, the feedback voltage is discharged and then allowed to charge. If, after being discharged, the feedback voltage reaches a voltage threshold during the timer setting time, a counter value is incremented and the next cycle begins. If the feedback voltage does not reach the voltage threshold within the timer setting time, the blanking time ends. If the counter value reaches a count threshold, a shutdown mode is initiated.

19 Claims, 6 Drawing Sheets

ADJUSTABLE BLANKING TIME FOR OVERLOAD PROTECTION FOR SWITCH-MODE POWER SUPPLIES

TECHNICAL FIELD

This disclosure relates to switch-mode power supplies, and more specifically to blanking time for overload protection for a switch-mode power supply controller.

BACKGROUND

Blanking time for overload protection (OLP) is often used by SMPS designers. For example, for LCD/LED TV applications, a millisecond level blanking time is often be used to protect the system against an over load condition (OLP) and also effectively to avoid OLP mistriggering caused by noise.

SUMMARY

In general, the disclosure is directed to a method and device in which a blanking time for a switch-mode power supply controller includes a first blanking time interval and a second blanking time interval. During the first blanking time interval, the time to charge the feedback voltage at the feedback input of the switch-mode power supply is measured, and a timer setting time is stored based on the measured time. During the second time interval, a series of charge cycles is used. At each charge cycle, the feedback voltage is discharged and then allowed to charge. If, after being discharged, the feedback voltage reaches a voltage threshold during the timer setting time, a counter value is incremented and the next cycle begins. If the feedback voltage does not reach the voltage threshold within the timer setting time, the blanking time ends. If the counter value reaches a count threshold, a shutdown mode is initiated.

In some examples, a device for overload protection comprises: a switch-mode power supply controller, including: a feedback pin that is coupled to a feedback node; a logic circuit that is arranged to determine whether a fault condition has ended by the end of a first blanking time interval; a capacitor size counter that is arranged to, if the logic circuit determines that the fault condition has not ended by the end of the first blanking time interval, measure a time that is based on an external component that is coupled to the feedback pin; a preset timer setting circuit that is arranged to, if the logic circuit determines that the fault condition has not ended by the end of the first blanking time interval, store a preset timer setting that is based on the measured time, wherein the logic circuit is further arranged to, if the logic circuit determines that the fault condition has not ended by the end of the first blanking time interval, during a second blanking time interval that proceeds the first blanking time interval, perform a charge cycle sequence such that the duration of the second blanking time interval is based on the timer setting time, and wherein performing the charge cycle sequence includes: determining whether a fault condition has ended during the second time interval; and if a fault condition is determined to have ended during the second blanking time interval, controlling ending the second blanking time interval and restarting controlling regulation of an output voltage based on a feedback voltage at the feedback node; and if the fault condition is determined not to have ended during the second blanking time interval, initiating a shutdown mode.

In some examples, a method for overload protection comprises: determining whether a fault condition has ended by the end of a first blanking time interval; and if it is determined that the fault condition has not ended by the end of the first blanking time interval: during the first blanking time interval, measuring a time that is based on an external component that is coupled to the feedback pin; storing a preset timer setting that is based on the measured time; and during a second blanking time interval that proceeds the first blanking time interval, performing a charge cycle sequence such that the duration of the second blanking time interval is based on the timer setting time, and wherein performing the charge cycle sequence includes: determining whether a fault condition has ended during the second time interval; and if a fault condition is determined to have ended during the second blanking time interval, controlling ending the second blanking time interval and restarting controlling regulation of an output voltage based on a feedback voltage at the feedback node; and if the fault condition is determined not to have ended during the second blanking time interval, initiating a shutdown mode.

In some examples, a device for overload protection comprises: means for determining whether a fault condition has ended by the end of a first blanking time interval; means for measuring a time that is based on an external component that is coupled to the feedback pin during the first time interval if it is determined that the fault condition has not ended by the end of the first blanking time interval; storing a preset timer setting that is based on the measured time if it is determined that the fault condition has not ended by the end of the first blanking time interval; and means for performing a charge cycle sequence such that the duration of the second blanking time interval is based on the timer setting time during a second blanking time interval that proceeds the first blanking time interval if it is determined that the fault condition has not ended by the end of the first blanking time interval, wherein the means for performing the charge cycle sequence includes: means for determining whether a fault condition has ended during the second time interval; means for controlling ending the second blanking time interval and restarting controlling regulation of an output voltage based on a feedback voltage at the feedback node if a fault condition is determined to have ended during the second blanking time interval; and means for initiating a shutdown mode if the fault condition is determined not to have ended by an end of the second blanking time interval.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

DETAILED DESCRIPTION

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," "in one example," as used herein does not necessarily refer to the same embodiment or example, although it may. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal.

Figure 1:
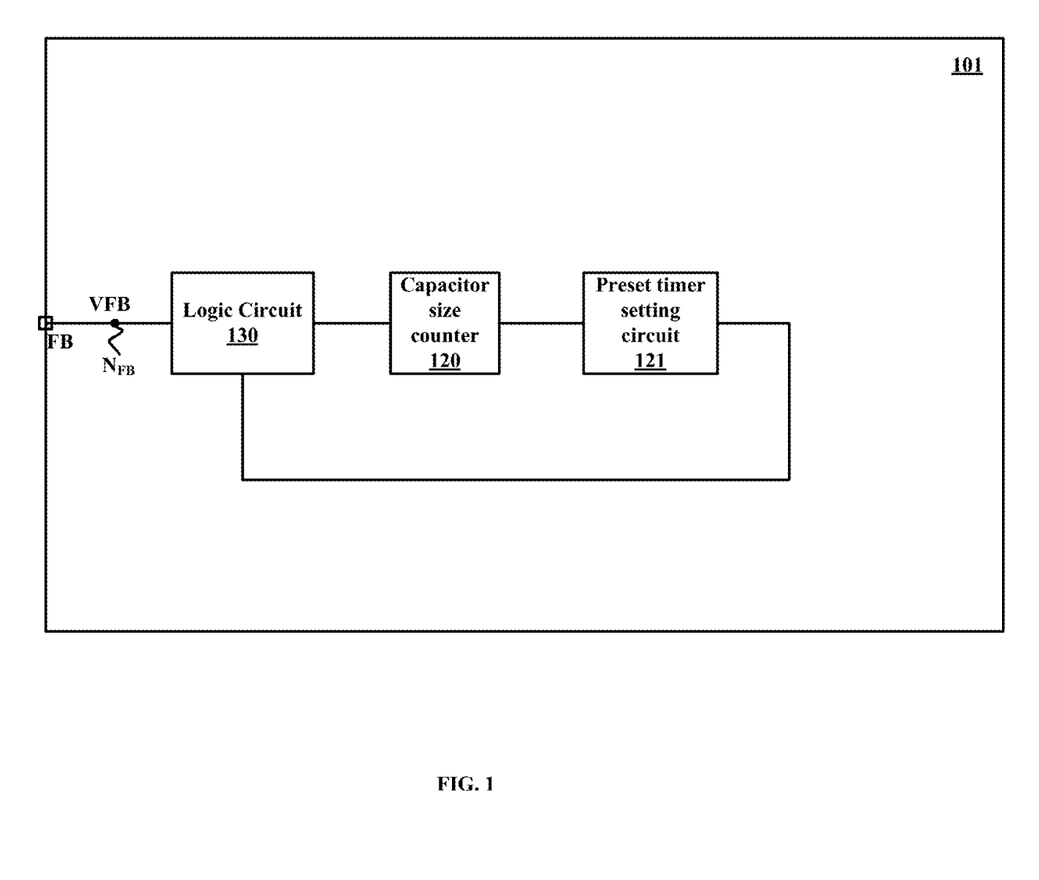
FIG. 1 is a block diagram illustrating an example of a switch-mode power supply controller.

FIG. 1 is a block diagram illustrating an example of switch-mode power supply (SMPS) controller 101. Switch-mode power supply controller 101 includes feedback pin FB, capacitor size counter 120, preset timer setting circuit 121, and logic circuit 130. In the example of FIG. 1, feedback pin FB is coupled to a feedback node $N_{FB}$.

Logic circuit that is arranged to determine whether a fault condition has ended by the end of a first blanking time interval (t 1). Capacitor size counter 120 is arranged to, if logic circuit 120 determines that the fault condition has not ended by the end of the first blanking time interval (t1), during t1, measure a time that is based on an external component (not shown in FIG. 1) that is coupled to feedback pin FB. Preset timer setting circuit 121 is arranged to, logic circuit 120 determines that the fault condition has not ended by the end of the first blanking time interval (t1), store a timer setting time (TOLP_R) such that the timer setting time (TOLP_R) is based on the time measured by capacitor size counter 120.

Logic circuit is further arranged to, if logic circuit 130 determines that the fault condition has not ended by the end of the first blanking time interval (t1), during a second blanking time interval (t2) that proceeds the first blanking time interval (t1), perform a charge cycle sequence such that the duration of the second blanking time interval (t2) is based on the timer setting time (TOLP_R), and wherein performing the charge cycle sequence includes determining whether a fault condition has ended during the second time interval, and further includes: controlling ending the second blanking time interval (t2) and restarting controlling regulation of an output voltage (not shown in FIG. 1), based on a feedback voltage (VFB) at the feedback node ($N_{FB}$) if a fault condition is determined to have ended during the second blanking time interval (t2), and initiating a shutdown mode if the fault condition is determined not to have ended by an end of the second blanking time interval (t2).

In some examples, logic circuit 130 may be further arranged to, during the first blanking time interval (t1), control discharging of feedback voltage VFB to a first voltage level (VFBL). Logic circuit 130 may be further arranged to, after discharging feedback voltage VFB to the first voltage level (VFBL) during the first blanking time interval (t1), control ending the first blanking time interval (t1) and restarting controlling regulation of the output voltage (not shown in FIG. 1) based on feedback voltage VFB if feedback voltage VFB did not reach the second voltage level (VFBH) during the first blanking time interval (t1). In some examples, logic circuit 130 is arranged to determine whether the fault condition has ended by the end of the first blanking time interval (t1) by determining whether feedback voltage VFB reaches the second voltage level (VFBH) during the first blanking time interval (t1) after being discharged to the first voltage level (VFBL).

In some examples, capacitor size counter 121 is arranged to measure the time based on an external component by measuring the time as how much time occurs between the feedback voltage being at the first voltage level and the feedback voltage being at a second voltage level.

In some examples, logic circuit 130 is arranged to performing the charge cycle sequence as follows. In particular, logic circuit 130 may be arranged to begin a first charge cycle of the second blanking interval (t2), and to control, during each charge cycle of the second blanking time interval (t2), the following actions. First, logic circuit 130 controls discharging VFB to the first voltage level (VFBL). Next, logic circuit 130 controls determining whether VFB reaches the second voltage level (VFBH) within the timer setting time (TOLP_R) after VFB was last discharged to the first voltage level (VFBL). Logic circuit 130 is further arranged such that, if VFB fails to reach the second voltage level (VFBH) within the timer setting time (TOLP_R) after VFB was last discharged to the first voltage level (VFBL), logic circuit 130 controls ending the second blanking time interval and restarting controlling regulation of an output voltage VO (not shown in FIG. 1) based on VFB.

Logic circuit 130 may be further arranged to control, if VFB reaches the second voltage level within the timer setting time after VFB was last discharged to the first voltage level (VFBL), incrementing a charge cycle counter value. Logic circuit 130 is further arranged such that, after the charge cycle counter value is incremented, if the charge cycle counter has reached a charge cycle count threshold (NOLP_E), logic circuit 130 controls initiating of a shutdown mode. In various examples, the shutdown mode may be a complete shutdown or a partial shutdown. Logic circuit 130 is further arranged such that, after the charge cycle counter value is incremented, if the charge cycle counter has failed to reach the charge cycle count threshold (NOLP_E), a next charge cycle of the second blanking time interval (t2) begins.

Figure 2:
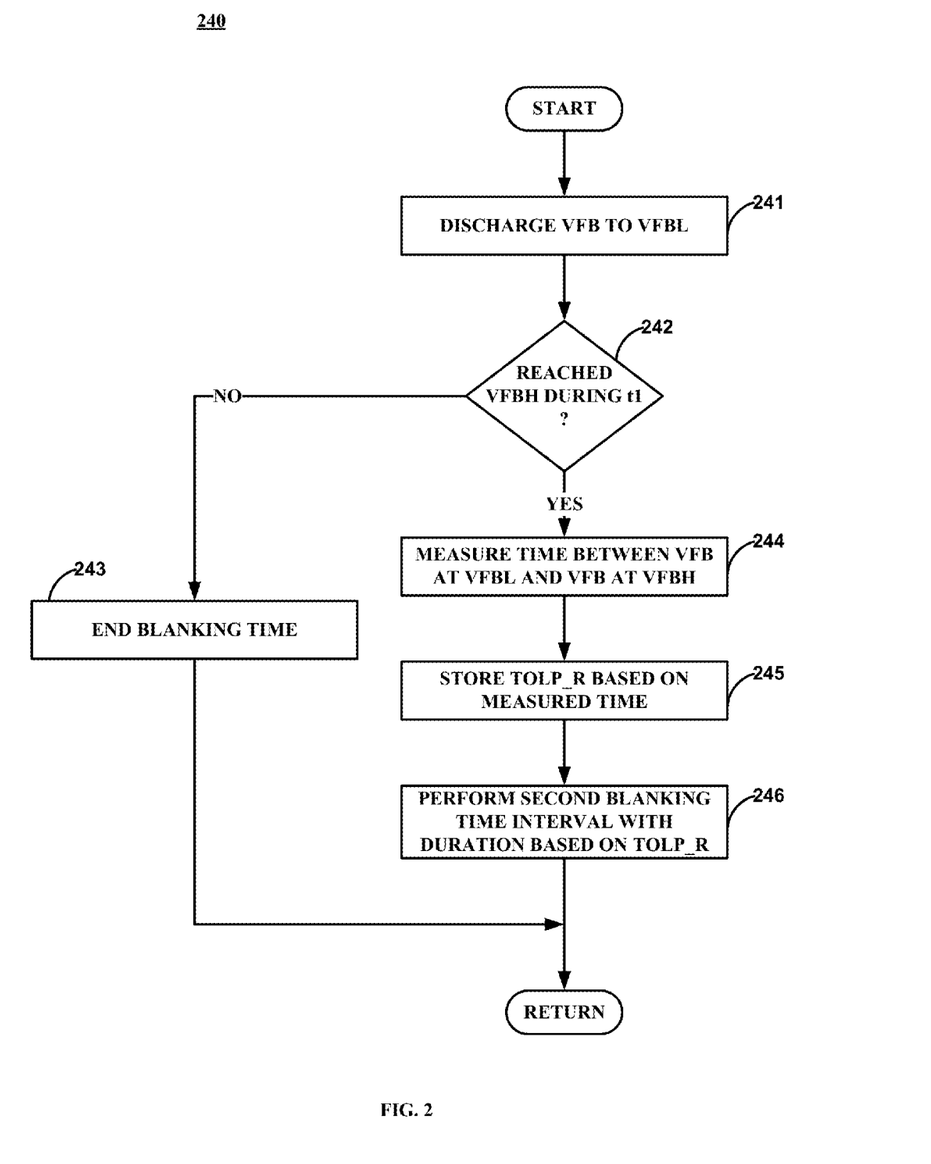
FIG. 2 is a flowchart illustrating an example of a process that may be employed by an example of the switch-mode power supply controller of FIG. 1.

FIG. 2 is a flowchart illustrating an example of process 240, which may be employed by an example of switch-mode power supply controller 101 of FIG. 1. After a start block, during a first blanking time interval, a logic circuit (e.g., logic circuit 130 of FIG. 1) controls discharging feedback voltage VFB at a feedback pin (e.g., feedback pin 110 of FIG. 1) of a switch mode power supply controller (e.g., switch-mode power supply controller 101) to a first voltage level (VFBL) (241). Next, the logic circuit makes a determination is made as to whether, after controlling discharging of the feedback voltage (VFB) to the first voltage level (VFBL) during the first blanking time interval (t1), the feedback voltage (VFB) reaches a second voltage level (VFBH) during the first blanking time interval t1 (242). If not, the logic circuit controls ending the first blanking time interval and restarting controlling regulation of an output voltage based on the feedback voltage (243), and then the process then advances to a return block, where other processing is resumed.

If instead VFB reaches VFBH during the first blanking time interval (t1), a capacitor size counter (e.g., capacitor size counter 120 of FIG. 1) measures how much time occurs between VFB being at the first voltage level (VFBL) and VFB being at a second voltage level (VFBH) (244). Then, a timer setting circuit (e.g., timer setting circuit 121 of FIG. 1) stores a timer setting time (TOLP_R) such that the timer setting time (TOLP_R) is based on the measured time between VFB being at the first voltage level (VFBL) and VFB being at the second voltage level (VFBH) during the first blanking time interval (t1) (245). Next, during a second blanking time interval (t2) that proceeds the first blanking time interval (t1), the logic circuit controls performing a charge cycle sequence such that the duration of the second blanking time interval (t2) is based on timer setting time TOLP_R (246). The processing then proceeds to the return block, where other processing is resumed.

In some examples, controlling performing the charge cycle sequence includes determining whether a fault condition has ended during t2, controlling ending the second blanking time interval and restarting controlling regulation of an output voltage based on feedback voltage VFB if a fault condition is determined to have ended during the second blanking time interval (t2), and further includes initiating a shutdown mode if the fault condition is determined not to have ended by an end of the second blanking time interval (t2).

In some examples, performing the charge cycle sequence includes beginning a first charge cycle of the second blanking time interval (t2), where each charge cycle of the second blanking time interval (t2) includes the following actions.

First, feedback voltage VFB is discharged to the first voltage level (VFBL). Next, a determination is made as to whether feedback voltage VFB reaches the second voltage level (VFBH) within the timer setting time (TOLP_R) after feedback voltage VFB was last discharged to the first voltage level (VFBL). If feedback voltage VFB fails to reach the second voltage level (VFBH) within the timer setting time (TOLP_R) after feedback voltage VFB was last discharged to the first voltage level (VFBL), the logic circuit controls ending the second blanking time interval (t2) and restarting controlling regulation of an output voltage based on feedback voltage VFB. If feedback voltage VFB reaches the second voltage level (VFBH) within the timer setting time (TOLP_R) after feedback voltage VFB was last discharged to the first voltage level (VFBL), the logic circuit increments a charge cycle counter value.

After incrementing the charge cycle counter value, if the charge cycle counter has reached a charge cycle count threshold (NOLP_E), the logic circuit initiates a shutdown mode. After incrementing the charge cycle counter value, if the charge cycle counter has failed to reach the charge cycle count threshold (NOLP_E), the logic circuit controls beginning a next charge cycle of the second blanking time interval (t2).

Figure 3:
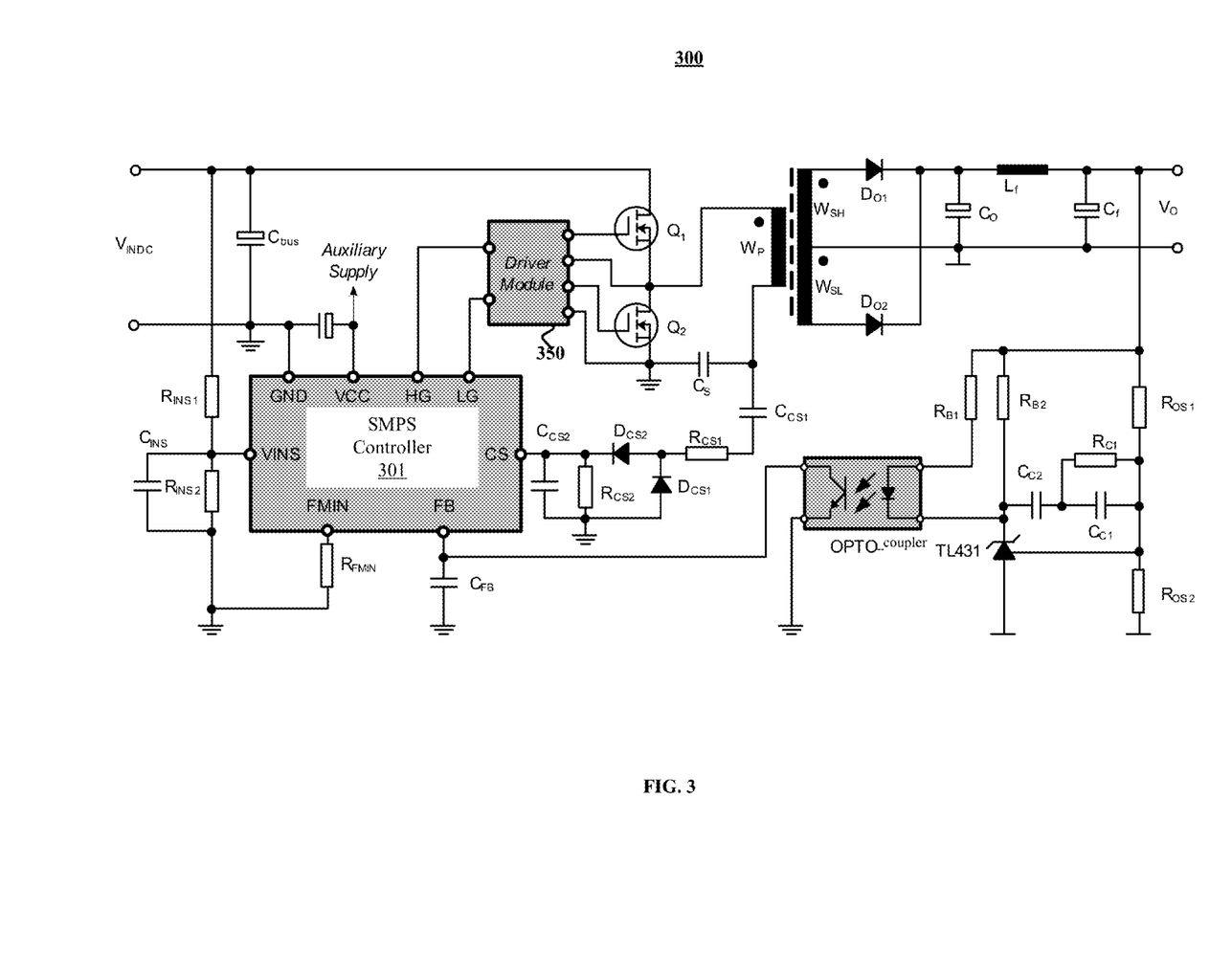
FIG. 3 is a block diagram of an example of a switch-mode power supply (SMPS) that includes an example of the switch-mode power supply controller of FIG. 1.

FIG. 3 is a block diagram of an example of switch-mode power supply (SMPS) 300, which includes SMPS controller 301, which may be employed as an example of switch-mode power supply controller 101 of FIG. 1. SMPS 300 further includes capacitors Cbus, CFB. CINS, CS, CCS1, CCS2, CO, CC1, CC2, and Cf; resistors RINS1, RINS2, RFMIN, RCS1, RCS2, RB1, RB2, RC1, Rc2, ROS1, and ROS2; diodes DCS1, DCS2, DO1, and DO2; three-terminal adjustable shunt regulator TL431; inductor LF; opto-coupler OPTO_coupler; transformer WP/WSH/WSL; power transistors Q1 and Q2; and driver module 350. The example SMPS 300 illustrated in FIG. 3 may operate in the conventional manner of a half-bridge resonant LLC switch-mode power supply, except for the blanking time, as follows in some examples. Although FIG. 3 specifically illustrates a half-bridge resonant LLC SMPS architecture, any suitable SMPS architecture may be employed for SMPS 300 within the scope and spirit of the disclosure.

In some examples, blanking time for SMPS 300 includes a first blanking time interval (t1) and a second blanking time interval (t2) that is immediately following and contiguous with t1, for a total blanking time of t1+t2, although the blanking time may end early, and in some instances the blanking time may end during t1 if the fault condition ends during t1 (in which case t2 does not occur). During the first blanking time interval (t1), the time to charge VFB is measured, and a timer setting time (TOLP_R) is stored based on the measured time. During the second time interval, a series of charge cycles is used. At each charge cycle, VFB is discharged and then allowed to charge. If, after being discharged, VFB reaches a voltage threshold during the timer setting time, a counter value is incremented and the next cycle begins. If VFB does not reach the voltage threshold within the timer setting time, the blanking time ends. If the counter value reaches a count threshold (NOLP_E), a shutdown mode is initiated.

Figure 4:
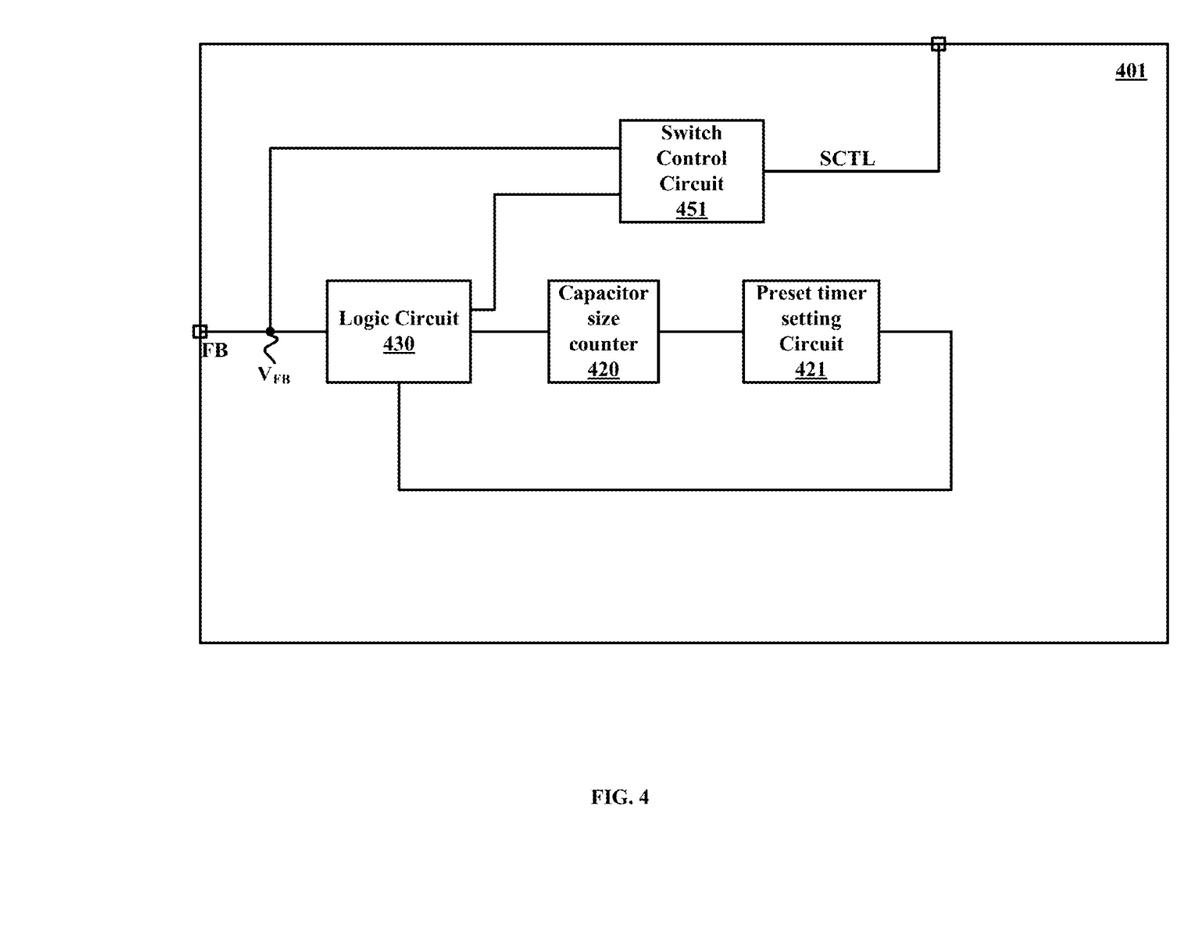
FIG. 4 is a block diagram illustrating an example of the switch-mode power supply controller of FIG. 1.

FIG. 4 is a block diagram illustrating an example of switch-mode power supply controller 401, which may be employed as an example of SMPS controller 101 FIG. 1. SMPS controller 401 further includes switch control circuit 451.

During normal operation, switch control circuit 451 is arranged to provide switch control signal(s) SCTL responsive to feedback voltage VFB so that switch control signals SCTL control regulation of output voltage VO (e.g., of FIG. 3). In some examples, if, during the second blanking time interval (t2), after VFB is discharged VFB does not reach the voltage threshold within the timer setting time, the blanking time ends, and logic circuit 430 causes switch control circuit 451 to resume normal operation and control regulation of output voltage VO via switch control signals SCTL. Further, in some examples, when logic circuit 430 determines that there is still a fault condition after the entire blanking time (t1+t2), logic circuit 430 provides an indication to switch control circuit 451 to enter into a shutdown mode.

Switch control circuit 451 may be arranged to provide one or more controls signals SCTL to control the opening and closing of one or more switches (e.g., transistors Q1 and Q2 of FIG. 3) external to SMPS controller 401. For example, with an SMPS topology such as the one illustrated in FIG. 3, there are two switches controller by switch control circuit 451, output from two pins HG and LG. However, in other examples, there may be more or less than two switches controlled by SMPS controller 401. As shown in FIG. 3, switch controls signals may go to one or more drivers which in turn drive the switches. In various examples, the driver(s) may be either internal or external to SMPS controller 401. In the example illustrated in FIG. 3, the driver are external to the SMPS controller and included in driver module 350.

Figure 5:
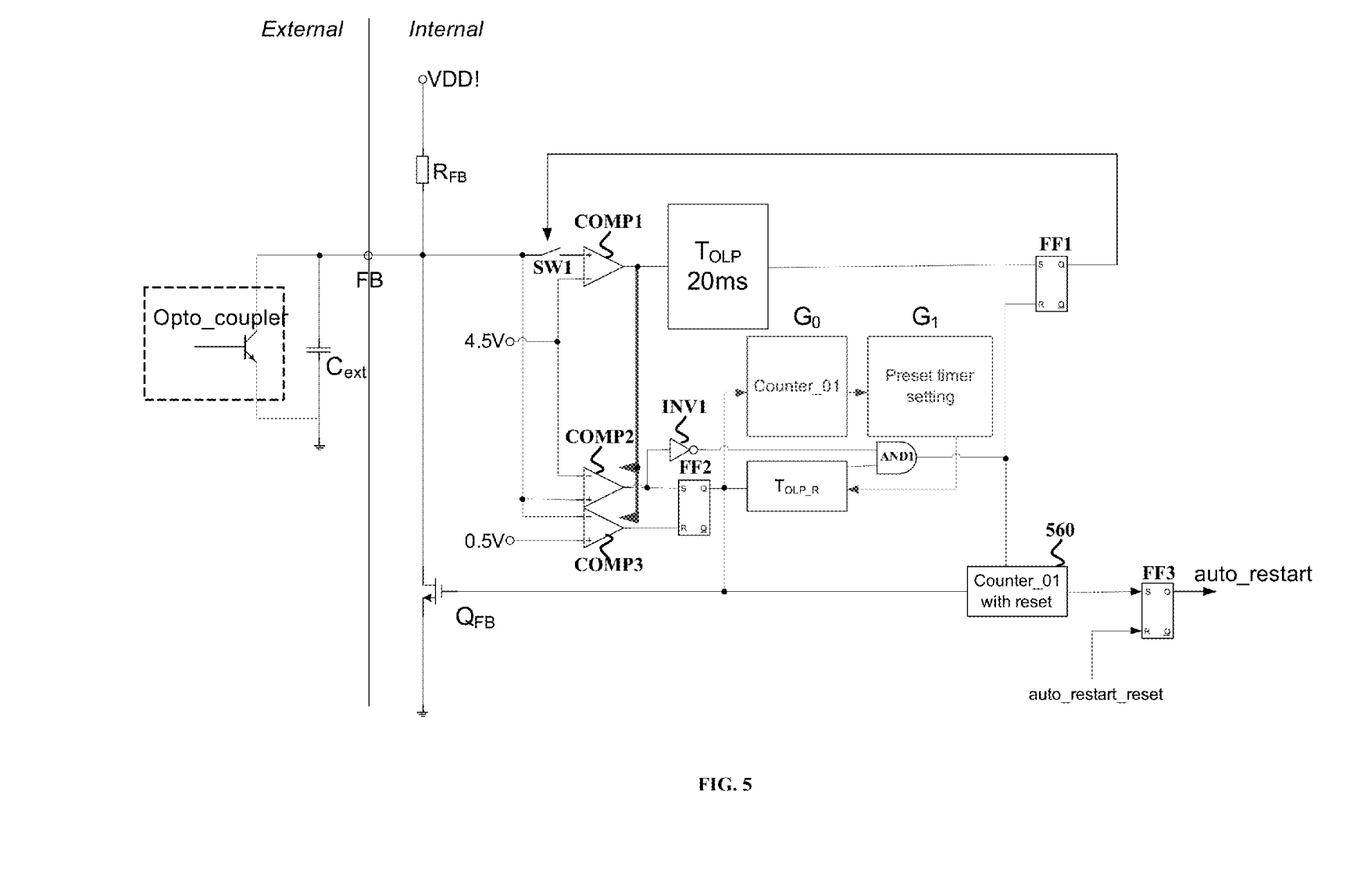
FIG. 5 is a block diagram illustrating a portion of the switch-mode power supply controller of FIG. 4.

FIG. 5 is a block diagram illustrating a portion of switch-mode power supply controller 501, which may be employed as an example of a portion of SMPS 401 of FIG. 4, along with external components Cext and opto-coupler Opto_coupler. SMPS controller 501 further includes resistor RFB and transistor QFB. Logic circuit 530 includes timer TOLP, timer TOLP_R, comparators COMP1-COMP3, flip-flops FF1-FF3, counter 560, switch SW1, inverter INV1, and AND gate AND1. In the example shown, SMPS controller 501 is integrated on an integrated circuit (IC). Capacitor size counter G0 is an example of capacitor size counter 120 of FIG. 1. Preset timer setting block G1 is an example of preset timer setting circuit 121 of FIG. 1.

SMPS controller 501 may be included as part of any one (or more) of a large variety of different suitable applications, including, but not limited to, audio applications. As such, in some examples, SMPS controller 501 may be part of an audio device, or any other suitable device that contains a SMPS.

Capacitor Cext may be used to provide for an adjustable blanking time (e.g., a total blanking time of t1+t2, where t1 is fixed and t2 varies based on external capacitor Cext). In these examples, with a larger capacitor value for Cext, the blanking time is longer. In some examples, rather than using an additional dedicated pin and external R-C network, SMPS controller 501 has a built-in feature to provide for an adjustable blanking time without adding any external component counts and without increasing the pin count. In these examples, the same feedback pin used for detecting the output voltage for voltage regulation is also used for the adjustable blanking time. Also, in some examples, the existing capacitor Cext, which is used for compensation of voltage VFB, is used by SMPS controller 501 to adjust the blanking time.

SMPS controller 501 may allow for a stable and adjustable blanking time to fit different application requirements. In some examples of SMPS controller 501, both of the OLP blanking time and preset time are adaptive for relatively wide range of external capacitor Cext which is connected to FB pin, so that the customer can freely choose a preferred blanking time by choosing corresponding external capacitor Cext value, without any need for additional external components or any additional pin or pins. The FB pin is used not only for regulation, but also for overload protection blanking time.

In some examples, in the case of an output overload condition, voltage VFB increases to its maximum level VFBH. In some examples, VFBH is greater than three volts, such as 4.5V. If VFB voltage is higher than VFBH (e.g., 4.5V in one non-limiting example) and this condition lasts longer than a fixed blanking time of TOLP (e.g., 20 ms in one non-limiting example), SMPS controller 501 starts the extended blanking time (i.e., the second blanking time interval t2). The extended blanking time may be realized by charging and discharging the filter capacitor CFB via the pull-up resistor RFB (e.g., 20 kohm in one non-limiting example) and transistor QFB.

In some examples, after VFB voltage has been higher than VFBH for the fixed blanking time t1 (e.g., 20 ms), logic circuit 530 controls will use internal switch QFB to discharge VFB to VFBL. In some examples, VFBL has a magnitude of less than one volt. In some examples, VFBL is 0.5 V. In some examples, after logic circuit 530 releases switch QFB, logic circuit 530 causes CFB will be charged up by Vdd (e.g., 5V) through RFB. The time needed for CFB being charged to VFBH may be estimated as:

$$t_{chg} = -\ln\left(\frac{V_{dd} - V_{FBH}}{V_{dd} - V_{FBL}}\right) \cdot R_{FB} \cdot C_{FB}$$

For instance, according to one example, if CFB is 10 nF, the charging time for capacitor Cext is about 439 us.

In some examples, blanking time is initiated when VFB remains higher than VFBH (e.g., 4.5 V) (when there is no explicit discharging performed by SMPS controller 501). Blanking may begin with a first blanking time interval, t1, that is initiated by timer tOLP. In some examples, t1 may be a fixed time interval, such as a fixed time interval of at least 10 ms, such as 20 ms. In other examples within the scope and spirit of the disclosure, t1 may be a fixed or variable time period other than 20 ms.

Also, in some examples during t1, SMPS controller 501 causes feedback voltage VFB to be pulled down to VFBL (e.g., 0.5V) and then released for one time. After VFB is released, internal power supply VDD! (as labeled in FIG. 5) may then charge external capacitor Cext through internal resistor RFB. While capacitor Cext is being charged, logic circuit 530 may control counter 520 to measure how much time it takes for Cext to be charged from VFBL (e.g., 0.5V) to VFBH (e.g., 4.5V). In some examples, If instead t1 completes and VFB is still below VFBH (e.g., 4.5V), logic circuit 530 controls SMPS controller 501 to resume to normal operation, and extended blanking time (t2) is not performed.

In some examples, if VFB does reach VFBH, blanking time operation continues. Preset setting circuit 521 may store a setting time TOLP_R that is based on the time determined by counter 520. TOLP_R time may then be used during extended blanking time t2 to judge whether system will resume to normal operation or not. For instance, in one example, if the timing for Cext to be charged from 0.5V to 4.5V is 300 is (as measured by counter 520), then setting time TOLP_R is to be 400 µs. Later, in this example, during extended blanking time t2, when Cext is charged from 0.5V to 4.5V within 400 us during extended blanking time, this indicates that the system is still in the overload condition, and will continue to charge and discharge Cext for up to a number of times given by a charge cycle count threshold NOLP_E (e.g., 256, 512, or the like) if the system remains in the overload condition. In this example, when instead Cext does not charge from 0.5V all the way to 4.5V within 400 As during extended blanking time t2, this indicates that the system is out of overload condition, and logic circuit 530 will cause the charging and discharging to stop and logic circuit 520 will control SMPS controller 501 to resume normal operation.

As discussed above, during extended blanking time t2, feedback voltage VFB may be pulled down to 0.5V and charged to 4.5V for up to a number of times given by the charge cycle count threshold NOLP_E (e.g., 512), unless the extended blanking time t2 is exited. (In some examples, the charge cycle count is at zero or is initialized to zero when t2 begins.) The extended blanking time t2 is exited if, during any charging phase, the charging time is longer than preset time TOLP_R, at which point logic circuit 530 causes the charging and discharging to stop, and controls SMPS controller 501 to resume to normal operation.

In some examples, after VFB reaches VFBH, an internal counter will increase by 1 and the capacitor is discharged to 0.5V by QFB again. The charging and discharging process of CFB may be repeated for NOLP_E (512) times if the fault condition still exists. After the last time of NOLP_E the VFB voltage is pulled down to zero, the charge cycle may stop switching after FB voltage rises to VFBH again. During the charging and discharging period, the charge cycle may operate with frequency that depends on preset timer value TOLP_R. If the charging time is shorter than preset time TOLP_R for each timing phase and a number of charge cycles occur equal to the charge cycle count threshold NOLP_E, SMPS controller 101 may enter into shutdown mode.

FIGS. 6A-6E are timing diagrams illustrating waveforms of examples of signals of examples of SMPS 300 of FIG. 3 in which the circuit of FIG. 5 is an example of a portion of SMPS controller 301 of FIG. 3. FIGS. 6A-6E refer to times t0-t9, but these times are different than times t1 and t2 referenced elsewhere in this document. In particular, t2-t6 of FIGS. 6A-6E represent the first blanking time interval (referred to as the first blanking time interval t1 elsewhere in this document), and t6-t8 of FIGS. 6A-6E represent the second blanking time interval (referred to as the second blanking time interval t2 or the extended blanking time t2 elsewhere in this document) for one example and t6-t9 represents the second blanking time interval for another example.

Figure 6A:
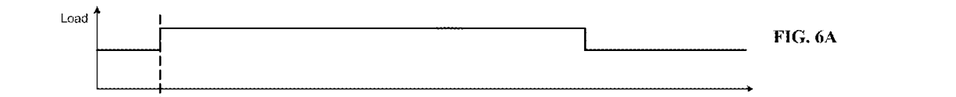
FIGS. 6A-6E are timing diagrams illustrating waveforms of example signals of examples of the SMPS 300 of FIG. 3 in which the circuit of FIG. 5 is an example of a portion of the SMPS controller of FIG. 3.
Figure 6B:
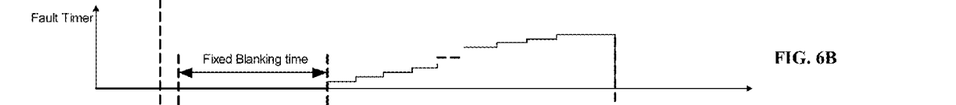
Figure 6C:
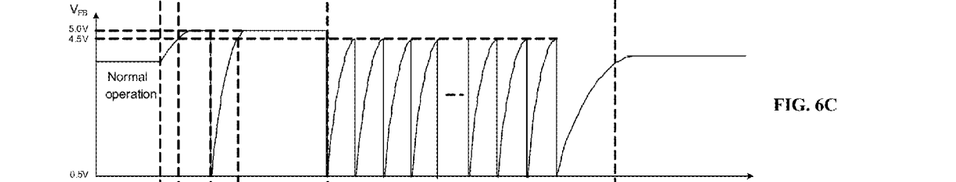
Figure 6D:
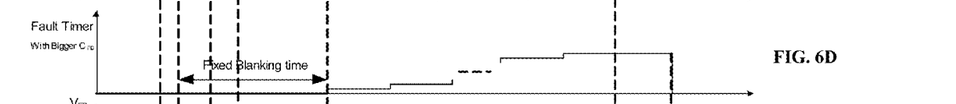
Figure 6E:
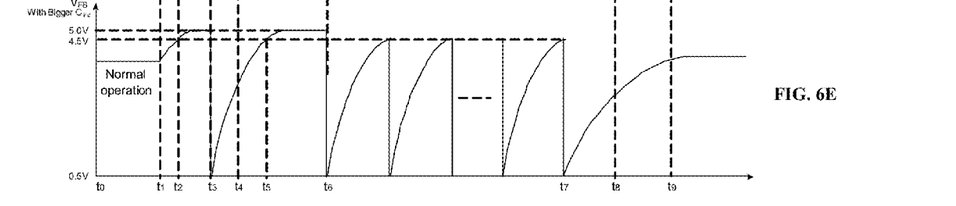

FIG. 6A illustrates a waveform of an example of load current Iload over time. FIG. 6B illustrates a waveform of an example of the fault timer 560 output, that is, the charge cycle counter value, over time. FIG. 6C illustrates a waveform of an example of feedback voltage VFB over time, where FIG. 6C is based on the same example as FIG. 6B. FIG. 6D illustrates a waveform of an example of the fault timer 560 output, that is, the charge cycle counter value, over time, where FIG. 6D illustrates an example in which CFB has a greater capacitance than CFB does for the example illustrated in FIG. 6B and FIG. 6C. FIG. 6E illustrates a waveform of an example of feedback voltage VFB over time, where FIG. 6E is based on the sample example as FIG. 6D.

At time t0, SMPS 300 is operating in accordance with normal operation, and is performing voltage regulation to provide output voltage $V_O$ in accordance with the normal operation of SMPS 300. At time t1, an overload condition occurs in which load current Iload increases. At time t2, feedback voltage VFB reaches 4.5V, and the first blanking time interval begins, where timer $T_{OLP}$ begins timing 20 ms starting with time t2. At time t3, feedback voltage VFB is discharged to 0.5V. At time t4, feedback voltage VFB of the example of FIG. 6C reaches 4.5V. At time t5, feedback voltage VFB of the example of FIG. 6E reaches 4.5V. At time t6, 20 ms has occurred since the time t2, as timed by timer $T_{OLP}$, and so first blanking time interval ends, and the second blanking time interval begins.

At time t8, feedback voltage VFB of the example of FIG. 6C fails to reach 4.5V within the timer setting time after feedback voltage VFB was last discharged to 0.5 V (time t7). Accordingly, at time t8, the blanking period ends and normal operation resumes for the example of FIG. 6C. At time t9, feedback voltage VFB of the example of FIG. 6E fails to reach 4.5V within the timer setting time after feedback voltage VFB was last discharged to 0.5 V (time t7). Accordingly, at time t9, the blanking period ends and normal operation resumes for the example of FIG. 6E.

Some examples of the disclosure are described below.

Example 1

A device for overload protection, comprising: a switch-mode power supply controller, including: a feedback pin that is coupled to a feedback node; a logic circuit that is arranged to determine whether a fault condition has ended by the end of a first blanking time interval; a capacitor size counter that is arranged to, if the logic circuit determines that the fault condition has not ended by the end of the first blanking time interval, during the first blanking time interval, measure a time that is based on an external component that is coupled to the feedback pin; a preset timer setting circuit that is arranged to, if the logic circuit determines that the fault condition has not ended by the end of the first blanking time interval, store a preset timer setting that is based on the measured time, wherein the logic circuit is further arranged to, if the logic circuit determines that the fault condition has not ended by the end of the first blanking time interval, during a second blanking time interval that proceeds the first blanking time interval, perform a charge cycle sequence such that the duration of the second blanking time interval is based on the timer setting time, and wherein performing the charge cycle sequence includes: determining whether a fault condition has ended during the second time interval; and if a fault condition is determined to have ended during the second blanking time interval, controlling ending the second blanking time interval and restarting controlling regulation of an output voltage based on a feedback voltage at the feedback node; and if the fault condition is determined not to have ended during the second blanking time interval, initiating a shutdown mode.

Example 2

The device of example 1, wherein the logic circuit is arranged to during the first blanking time interval, control discharging of the feedback voltage to a first voltage level, wherein the logic circuit is arranged to determine whether the fault condition has ended by the end of a first blanking time interval by determining whether the feedback voltage reaches a second voltage level during the first blanking time interval after being discharged to the first voltage level; after discharging the feedback voltage to the first voltage level during the first blanking time interval, control ending the first blanking time interval and restarting controlling regulation of an output voltage based on the feedback voltage if the feedback voltage did not reach a second voltage level during the first blanking time interval, wherein the capacitor size counter is arranged to, if the feedback voltage reached the second voltage level during the first blanking interval, measure the time that is based on a size of an external component that is coupled to the feedback pin by measuring the time as how much time occurs between the feedback voltage being at the first voltage level and the feedback voltage being at a second voltage level, and wherein the logic circuit is arranged to performing the charge cycle sequence by beginning a first charge cycle of the second blanking time interval, wherein the logic circuit is arranged to control each charge cycle of the second blanking time interval such that each charge cycle of the second blanking time interval includes: discharging the feedback voltage to the first voltage level; determining whether the feedback voltage reaches the second voltage level within the timer setting time after the feedback voltage was last discharged to the first voltage level; if the feedback voltage fails to reach the second voltage level within the timer setting time after the feedback voltage was last discharged to the first voltage level, ending the second blanking time interval and restarting controlling regulation of an output voltage based on the feedback voltage; if the feedback voltage reaches the second voltage level within the timer setting time after the feedback voltage was last discharged to the first voltage level, incrementing a charge cycle counter value; after incrementing the charge cycle counter value, if the charge cycle counter has reached a charge cycle count threshold, initiating a shutdown mode; and after incrementing the charge cycle counter value, if the charge cycle counter has failed to reach the charge cycle count threshold, beginning a next charge cycle of the second blanking time interval.

Example 3

The device of examples 2, wherein the switch-mode power supply controller further includes a transistor that is coupled to the feedback pin and a pull-up resistor that is coupled to the feedback pin, wherein the logic circuit is arranged to control discharging of the feedback voltage to a first voltage level during the first blanking interval by controlling the transistor, and wherein the logic circuit is further arranged to control charging of the feedback voltage via the transistor and the pull-up resistor.

Example 4

The device of any combination of examples 2-3, wherein the charge cycle count threshold is at least 256.

Example 5

The device of any combination of examples 1-4, further comprising a compensation network that is external to the switch-mode power supply controller, wherein the compensation network includes a capacitor that is coupled to the feedback pin.

Example 6

The device of example 5, wherein the time that occurs between the feedback voltage being at the first voltage level and the feedback voltage being at a second voltage level is based on a size of the capacitor that is coupled to the feedback pin.

Example 7

The device of example 1, further comprising a switch-mode power supply that includes the switch-mode power supply controller.

Example 8

The device of example 7, wherein the switch-mode power supply is a half-bridge resonant LLC switch-mode power supply.

Example 9

The device of any combination of examples 7-8, further comprising an audio device that includes the switch-mode power supply.

Example 10

A method for overload protection, comprising: determining whether a fault condition has ended by the end of a first blanking time interval; and if it is determined that the fault condition has not ended by the end of the first blanking time interval: during the first time interval, measuring a time that is based on an external component that is coupled to the feedback pin; storing a preset timer setting that is based on the measured time; during a second blanking time interval that proceeds the first blanking time interval, performing a charge cycle sequence such that the duration of the second blanking time interval is based on the timer setting time, and wherein performing the charge cycle sequence includes: determining whether a fault condition has ended during the second time interval; and if a fault condition is determined to have ended during the second blanking time interval, controlling ending the second blanking time interval and restarting controlling regulation of an output voltage based on a feedback voltage at the feedback node; and if the fault condition is determined not to have ended during the second blanking time interval, initiating a shutdown mode.

Example 11

The method of example 10, further comprising: during the first blanking time interval, controlling discharging of the feedback voltage to a first voltage level, wherein determining whether a fault condition has ended by the end of a first blanking time interval includes determining whether the feedback voltage reaches a second voltage level during the first blanking time interval after being discharged to the first voltage level; after discharging the feedback voltage to the first voltage level during the first blanking time interval, controlling ending the first blanking time interval and restarting controlling regulation of an output voltage based on the feedback voltage if the feedback voltage did not reach the second voltage level during the first blanking time interval, wherein measuring a time that is based on an external component that is coupled to the feedback pin includes measuring the time as how much time occurs between the feedback voltage being at the first voltage level and the feedback voltage being at a second voltage level, and wherein performing the charge cycle sequence includes beginning a first charge cycle of the second blanking time interval, and wherein performing the charge cycle sequence includes: beginning a first charge cycle of the second blanking time interval, wherein each charge cycle of the second blanking time interval includes: discharging the feedback voltage to the first voltage level; determining whether the feedback voltage reaches the second voltage level within the timer setting time after the feedback voltage was last discharged to the first voltage level; if the feedback voltage fails to reach the second voltage level within the timer setting time after the feedback voltage was last discharged to the first voltage level, ending the second blanking time interval and restarting controlling regulation of an output voltage based on the feedback voltage; if the feedback voltage reaches the second voltage level within the timer setting time after the feedback voltage was last discharged to the first voltage level, incrementing a charge cycle counter value; after incrementing the charge cycle counter value, if the charge cycle counter has reached a charge cycle count threshold, initiating a shutdown mode; and after incrementing the charge cycle counter value, if the charge cycle counter has failed to reach the charge cycle count threshold, beginning a next charge cycle of the second blanking time interval.

Example 12

The method of any combination of examples 11, wherein the external component is a capacitor that is coupled to the feedback pin, and wherein the time that occurs between the feedback voltage being at the first voltage level and the feedback voltage being at a second voltage level is based on a size of the capacitor.

Example 13

The method of any combination of examples 11-12, wherein the charge cycle count threshold is at least 256.

Example 14

The method of any combination of examples 11-13, wherein the first blanking time interval is a fixed time interval of at least ten milliseconds.

Example 15

The method of any combination of examples 11-14, wherein the first voltage level has a magnitude that is less than one volt.

Example 16

The method of any combination of examples 11-15, wherein the second voltage level is greater than 3 volts.

Example 17

A device for overload protection, comprising: means for determining whether a fault condition has ended by the end of a first blanking time interval; means for measuring a time that is based on an external component that is coupled to the feedback pin during the first time interval if it is determined that the fault condition has not ended by the end of the first blanking time interval; storing a preset timer setting that is based on the measured time if it is determined that the fault condition has not ended by the end of the first blanking time interval; and means for performing a charge cycle sequence such that the duration of the second blanking time interval is based on the timer setting time during a second blanking time interval that proceeds the first blanking time interval if it is determined that the fault condition has not ended by the end of the first blanking time interval, wherein the means for performing the charge cycle sequence includes: means for determining whether a fault condition has ended during the second time interval; means for controlling ending the second blanking time interval and restarting controlling regulation of an output voltage based on a feedback voltage at the feedback node if a fault condition is determined to have ended during the second blanking time interval; and means for initiating a shutdown mode if the fault condition is determined not to have ended by an end of the second blanking time interval.

Example 18

The device of example 17, further comprising: means for controlling discharging of the feedback voltage to a first voltage level during the first blanking time interval, where the means for determining whether the fault condition has ended by the end of the first blanking time interval includes means for determining whether the feedback voltage reaches a second voltage level during the first blanking time interval after being discharged to the first voltage level; means for, after discharging the feedback voltage to the first voltage level during the first blanking time interval, controlling ending the first blanking time interval and restarting controlling regulation of an output voltage based on the feedback voltage if the feedback voltage did not reach a second voltage level during the first blanking time interval, wherein the means for measuring a time that is based on an external component that is coupled to the feedback pin includes means for measuring the time as how much time occurs between the feedback voltage being at the first voltage level and the feedback voltage being at a second voltage level, and wherein the means for performing the charge cycle sequence includes means for beginning a first charge cycle of the second blanking time interval, and wherein the means for performing the charge cycle sequence includes: means for beginning a first charge cycle of the second blanking time interval, wherein each charge cycle of the second blanking time interval includes: discharging the feedback voltage to the first voltage level; determining whether the feedback voltage reaches the second voltage level within the timer setting time after the feedback voltage was last discharged to the first voltage level; if the feedback voltage fails to reach the second voltage level within the timer setting time after the feedback voltage was last discharged to the first voltage level, ending the second blanking time interval and restarting controlling regulation of an output voltage based on the feedback voltage; if the feedback voltage reaches the second voltage level within the timer setting time after the feedback voltage was last discharged to the first voltage level, incrementing a charge cycle counter value; after incrementing the charge cycle counter value, if the charge cycle counter has reached a charge cycle count threshold, initiating a shutdown mode; and after incrementing the charge cycle counter value, if the charge cycle counter has failed to reach the charge cycle count threshold, beginning a next charge cycle of the second blanking time interval.

Example 19

The device of example 18, wherein the charge cycle count threshold is at least 256.

Example 20

The device of any combination of examples 18-19, wherein the time that occurs between the feedback voltage being at the first voltage level and the feedback voltage being at a second voltage level is based on a size of a capacitor that is coupled to the feedback pin.

Various examples have been described. These and other examples are within the scope of the following claims.

What is claimed is:
1. A device for overload protection, comprising:
a switch-mode power supply controller, including:
a feedback pin that is coupled to a feedback node;

a logic circuit that is arranged to determine whether a fault condition has ended by an end of a first blanking time interval;
a capacitor size counter that is arranged to, if the logic circuit determines that the fault condition has not ended by the end of the first blanking time interval, during the first blanking time interval, measure a time that is based on an external component that is coupled to the feedback pin;
a preset timer setting circuit that is arranged to, if the logic circuit determines that the fault condition has not ended by the end of the first blanking time interval, store a preset timer setting that is based on the measured time,
wherein the logic circuit is further arranged to, if the logic circuit determines that the fault condition has not ended by the end of the first blanking time interval, during a second blanking time interval that follows the first blanking time interval, perform a charge cycle sequence such that a duration of the second blanking time interval is based on the preset timer setting, and
wherein performing the charge cycle sequence includes:
determining whether a fault condition has ended during the second blanking time interval;
if a fault condition is determined to have ended during the second blanking time interval, controlling ending the second blanking time interval and restarting controlling regulation of an output voltage based on a feedback voltage at the feedback node; and
if the fault condition is determined not to have ended during the second blanking time interval, initiating a shutdown mode.

2. The device of claim 1, wherein
the logic circuit is arranged to:
during the first blanking time interval, control discharging of the feedback voltage to a first voltage level, wherein the logic circuit is arranged to determine whether the fault condition has ended by the end of the first blanking time interval by determining whether the feedback voltage reaches a second voltage level during the first blanking time interval after being discharged to the first voltage level;
after discharging the feedback voltage to the first voltage level during the first blanking time interval, control ending the first blanking time interval and restarting controlling regulation of the output voltage based on the feedback voltage if the feedback voltage did not reach the second voltage level during the first blanking time interval, wherein the capacitor size counter is arranged to, if the feedback voltage reached the second voltage level during the first blanking time interval, measure the time that is based on a size of an external component that is coupled to the feedback pin by measuring the time as how much time occurs between the feedback voltage being at the first voltage level and the feedback voltage being at the second voltage level, and wherein the logic circuit is arranged to perform a charge cycle sequence by beginning a first charge cycle of the second blanking time interval, wherein the logic circuit is arranged to control a second cycle of the second blanking time interval such that the second cycle of the second blanking time interval includes:

discharging the feedback voltage to the first voltage level;
determining whether the feedback voltage reaches the second voltage level within the timer setting time after the feedback voltage was last discharged to the first voltage level;
if the feedback voltage fails to reach the second voltage level within the timer setting time after the feedback voltage was last discharged to the first voltage level, ending the second blanking time interval and restarting controlling regulation of the output voltage based on the feedback voltage;
if the feedback voltage reaches the second voltage level within the timer setting time after the feedback voltage was last discharged to the first voltage level, incrementing a charge cycle counter value;
after incrementing the charge cycle counter value, if the charge cycle counter has reached a charge cycle count threshold, initiating the shutdown mode; and
after incrementing the charge cycle counter value, if the charge cycle counter has failed to reach the charge cycle count threshold, beginning a next charge cycle of the second blanking time interval.

3. The device of claim 2, wherein the switch-mode power supply controller further includes a transistor that is coupled to the feedback pin and a pull-up resistor that is coupled to the feedback pin, wherein the logic circuit is arranged to control discharging of the feedback voltage to the first voltage level during the first blanking time interval by controlling the transistor, and wherein the logic circuit is further arranged to control charging of the feedback voltage via the transistor and the pull-up resistor.

4. The device of claim 2, wherein the charge cycle count threshold is at least two hundred fifty six.

5. The device of claim 1, further comprising a compensation network that is external to the switch-mode power supply controller, wherein the compensation network includes an external capacitor that is coupled to the feedback pin.

6. The device of claim 5, wherein the time that occurs between the feedback voltage being at a first voltage level and the feedback voltage being at a second voltage level is based on a size of the capacitor that is coupled to the feedback pin, wherein the capacitor is the external component that is coupled to the feedback pin.

7. The device of claim 1, further comprising a switch-mode power supply that includes the switch-mode power supply controller.

8. The device of claim 7, wherein the switch-mode power supply is a half-bridge resonant LLC switch-mode power supply.

9. A method for overload protection, comprising:
determining whether a fault condition has ended by the end of a first blanking time interval; and
if it is determined that the fault condition has not ended by the end of the first blanking time interval:
during the first time interval, measuring a time that is based on an external component that is coupled to a feedback pin;
storing a preset timer setting that is based on the measured time; and
during a second blanking time interval that follows the first blanking time interval, performing a charge cycle sequence such that a duration of the second blanking time interval is based on the preset timer setting, and wherein performing the charge cycle sequence includes:

determining whether the fault condition has ended during the second blanking time interval;
if the fault condition is determined to have ended during the second blanking time interval, controlling ending the second blanking time interval and restarting controlling regulation of an output voltage based on a feedback voltage at a feedback node; and
if the fault condition is determined not to have ended during the second blanking time interval, initiating a shutdown mode.

10. The method of claim 9, further comprising:
during the first blanking time interval, controlling discharging of the feedback voltage to a first voltage level, wherein determining whether the fault condition has ended by an end of the first blanking time interval includes determining whether the feedback voltage reaches a second voltage level during the first blanking time interval after being discharged to the first voltage level;
after discharging the feedback voltage to the first voltage level during the first blanking time interval, controlling ending the first blanking time interval and restarting controlling regulation of the output voltage based on the feedback voltage if the feedback voltage did not reach the second voltage level during the first blanking time interval, wherein measuring a time that is based on an external component that is coupled to the feedback pin includes measuring the time as how much time occurs between the feedback voltage being at the first voltage level and the feedback voltage being at the second voltage level, and wherein performing the charge cycle sequence includes beginning a first charge cycle of the second blanking time interval, and wherein performing the charge cycle sequence includes:
beginning the first charge cycle of the second blanking time interval, wherein the first charge cycle of the second blanking time interval includes:
discharging the feedback voltage to the first voltage level;
determining whether the feedback voltage reaches the second voltage level within the timer setting time after the feedback voltage was last discharged to the first voltage level;
if the feedback voltage fails to reach the second voltage level within the timer setting time after the feedback voltage was last discharged to the first voltage level, ending the second blanking time interval and restarting controlling regulation of the output voltage based on the feedback voltage;
if the feedback voltage reaches the second voltage level within the timer setting time after the feedback voltage was last discharged to the first voltage level, incrementing a charge cycle counter value;
after incrementing the charge cycle counter value, if the charge cycle counter has reached a charge cycle count threshold, initiating the shutdown mode; and
after incrementing the charge cycle counter value, if the charge cycle counter has failed to reach the charge cycle count threshold, beginning a next charge cycle of the second blanking time interval.

11. The method of claim 10, wherein the external component is a capacitor that is coupled to the feedback pin, and wherein the time that occurs between the feedback voltage being at the first voltage level and the feedback voltage being at the second voltage level is based on a size of the capacitor.

12. The method of claim 10, wherein the charge cycle count threshold is at least two hundred fifty six.

13. The method of claim 10, wherein the first blanking time interval is a fixed time interval of at least ten milliseconds.

14. The method of claim 10, wherein the first voltage level has a magnitude that is less than one volt.

15. The method of claim 10, wherein the second voltage level is greater than 3 volts.

16. A device for overload protection, comprising:
means for determining whether a fault condition has ended by the end of a first blanking time interval;
means for measuring a time that is based on an external component that is coupled to a feedback pin during the first time interval if it is determined that the fault condition has not ended by the end of the first blanking time interval;
means for storing a preset timer setting that is based on the measured time if it is determined that the fault condition has not ended by the end of the first blanking time interval; and
means for performing a charge cycle sequence such that a duration of the second blanking time interval is based on the preset timer setting during a second blanking time interval that follows the first blanking time interval if it is determined that the fault condition has not ended by the end of the first blanking time interval, wherein the means for performing the charge cycle sequence includes:
means for determining whether the fault condition has ended during the second blanking time interval;
means for controlling ending the second blanking time interval and restarting controlling regulation of an output voltage based on a feedback voltage at a feedback node if the fault condition is determined to have ended during the second blanking time interval; and
means for initiating a shutdown mode if the fault condition is determined not to have ended by an end of the second blanking time interval.

17. The device of claim 16, further comprising:
means for controlling discharging of the feedback voltage to a first voltage level during the first blanking time interval, where the means for determining whether the fault condition has ended by the end of the first blanking time interval includes means for determining whether the feedback voltage reaches a second voltage level during the first blanking time interval after being discharged to the first voltage level;
means for, after discharging the feedback voltage to the first voltage level during the first blanking time interval, controlling ending the first blanking time interval and restarting controlling regulation of the output voltage based on the feedback voltage if the feedback voltage did not reach the second voltage level during the first blanking time interval, wherein the means for measuring a time that is based on an external component that is coupled to the feedback pin includes means for measuring the time as how much time occurs between the feedback voltage being at the first voltage level and the feedback voltage being at the second voltage level, and wherein the means for performing the charge cycle sequence includes means for beginning a first charge cycle of the second blanking time interval, and wherein the means for performing the charge cycle sequence includes:

means for beginning the first charge cycle of the second blanking time interval, wherein the first charge cycle of the second blanking time interval includes:
discharging the feedback voltage to the first voltage level;
determining whether the feedback voltage reaches the second voltage level within the timer setting time after the feedback voltage was last discharged to the first voltage level;
if the feedback voltage fails to reach the second voltage level within the timer setting time after the feedback voltage was last discharged to the first voltage level, ending the second blanking time interval and restarting controlling regulation of the output voltage based on the feedback voltage;
if the feedback voltage reaches the second voltage level within the timer setting time after the feedback voltage was last discharged to the first voltage level, incrementing a charge cycle counter value;
after incrementing the charge cycle counter value, if the charge cycle counter has reached a charge cycle count threshold, initiating a shutdown mode; and
after incrementing the charge cycle counter value, if the charge cycle counter has failed to reach the charge cycle count threshold, beginning a next charge cycle of the second blanking time interval.

18. The device of claim 17, wherein the charge cycle count threshold is at least two hundred fifty six.

19. The device of claim 17, wherein the time that occurs between the feedback voltage being at the first voltage level and the feedback voltage being at the second voltage level is based on a size of a capacitor that is coupled to the feedback pin.

* * * * *